United States Patent [19]

Noda

[11] 4,370,535
[45] Jan. 25, 1983

[54] MICROWAVE OVEN POWER CONTROL SYSTEM

[75] Inventor: Tomimitsu Noda, Fuji, Japan

[73] Assignee: Tokyo Shibaura Denki Kabushiki Kaisha, Kawasaki, Japan

[21] Appl. No.: 274,867

[22] Filed: Jun. 18, 1981

Related U.S. Application Data

[63] Continuation of Ser. No. 90,684, Nov. 2, 1979, abandoned.

[30] Foreign Application Priority Data

Nov. 6, 1978 [JP] Japan ............................ 53-152533

[51] Int. Cl.³ ............................................... H05B 6/68
[52] U.S. Cl. ........................ 219/10.55 B; 219/10.55 E
[58] Field of Search ................. 219/10.55 B, 10.55 E, 219/10.55 R, 10.55 M, 494; 340/588

[56] References Cited

U.S. PATENT DOCUMENTS 3,470,942 10/1969 Fukada et al. ............... 219/10.55 B
4,119,957 10/1978 Sasaki et al. ............. 219/10.55 B X
4,220,840 9/1980 Barker ......................... 219/10.55 B

FOREIGN PATENT DOCUMENTS 2753405 6/1978 Fed. Rep. of Germany ... 219/10.55 B
2917007 10/1979 Fed. Rep. of Germany ... 219/10.55 B
51-147038 12/1976 Japan ............................ 219/10.55 B
52-1547 1/1977 Japan ............................ 219/10.55 B
52-17236 2/1977 Japan ............................ 219/10.55 B

OTHER PUBLICATIONS

AD. Brochure, Toshiba ER-798BT, The Touch Control Programmable MW Oven, on sale in U.S. 4/78.

Primary Examiner—Roy N. Envall, Jr.
Assistant Examiner—Philip H. Leung
Attorney, Agent, or Firm—Oblon, Fisher, Spivak, McClelland & Maier

[57] ABSTRACT

A microwave oven having an oven cavity and including an electric power source, a magnetron for generating microwave energy in the oven cavity in which foods to be heated are placed, control means coupled to said magnetron in order to control the power of the magnetron, wherein the control means include sensor means for sensing the temperature of the food placed in the oven cavity, and temperature setting means for controlling the magnetron power output in response to the detected food temperature to provide a variable microwave energy output under the control of the control means.

10 Claims, 7 Drawing Figures

MICROWAVE OVEN POWER CONTROL SYSTEM

This is a continuation of application Ser. No. 090,684, now abandoned.

BACKGROUND OF THE INVENTION

1. Title of the Invention

The present invention relates generally to a microwave oven of the type including a duty cycle control to vary power level, and more particularly to a means for decreasing the magnetron power by way of a plurality of intermediate power levels during the thawing of different food products.

2. Description of the Prior Art

An often used method for thawing processed and prepared foods in a microwave oven involves setting a program timer for a desired span of time while keeping the magnetron power level relatively low. The thawing period and the power level may depend upon the quality of nature of the food, however, and thus deciding the time-power level conditions is known to be intricate.

In the meantime there has been developed a control system called a duty cycle control in which the power transformer and the magnetron are alternately switched between a full-on operation and a full-off operation. The ratio of "on" time compared to the total operation time is known as the duty cycle. The average magnetron power level is the actual power output of the microwave oven.

Various particular circuits have been proposed to effect duty cycle power control. These control systems range from a simple cam-functioned mechanical timer, to more advanced systems adopting electronic timing and switching elements.

Although the above-described methods and systems are in practical use, no appropriate power control systems have been made available that function in relation to the temperature of the food undergoing thawing.

SUMMARY OF THE INVENTION

Accordingly, one object of this invention is to provide a novel circuit employing duty cycle control techniques for thawing foods by means of a plurality of decreased magnetron power levels depending upon the food temperature.

It is another object of the invention to provide a novel circuit for duty cycle control with which frozen foods can be effectively thawed back to their original conditions without being impaired.

In accordance with this invention, a temperature sensing probe is to be provided, being connected to a comparating block which comprises an amplifier, a plurality of variable resistors and a plurality of comparators.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
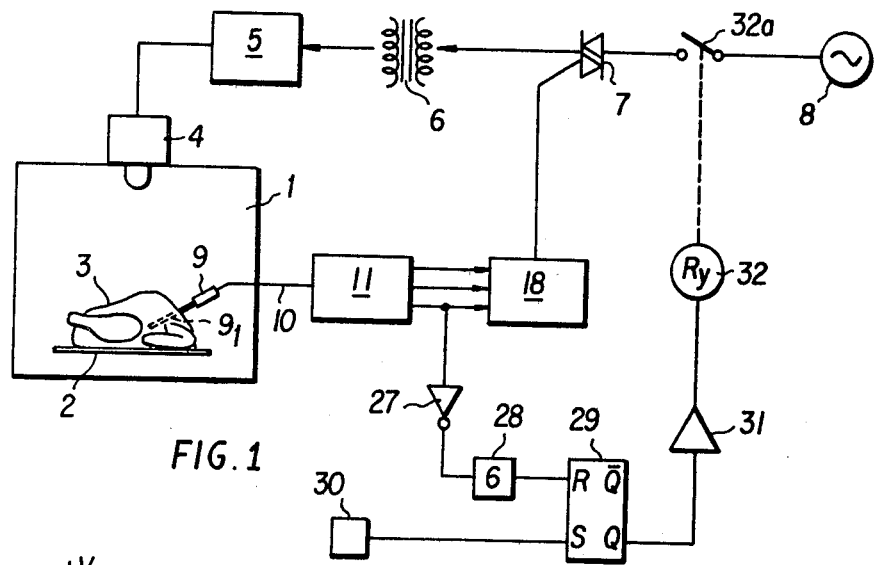
FIG. 1 is a simplified schematic diagram of a magnetron power control system employed in a microwave oven illustrating the general principles of the invention.

Referring now to the drawings, wherein like reference numerals designate identical or corresponding parts throughout the several views, and more particularly to FIG. 1 thereof, a simplified microwave oven control system includes a cooking cavity 1 in which food 3 to be defrosted is placed on a suitable disk on a dielectric member 2, being exposed to the microwave energy generated by the magnetron 4, which is secured in the ceiling of the heating cavity 1.

The power supply circuit of the magnetron 4 includes a high power transformer having a high voltage secondary winding connected to energize the magnetron through a conventional half-wave voltage doubler 5 comprising a series capacitor and a rectifying diode connected across the magnetron anode and cathode terminals.

The primary winding of the power transformer 6 is connected to a thyristor 7 which alternately energizes and deenergizes the power transformer 6 in response to the gate signals applied to the gate thereof. The thyristor 7 is also connected to an AC power source 8, such as a 100 V, 50/60 Hz household branch circuit, through a normally open switch 32a which is energized by the switching relay 32.

Additionally, a thermal sensing probe 9 is provided inside the heating cavity 1 having a stick-like thermal sensing element $9_1$, such as a thermistor, which is to be inserted in the food. Preferably, that part of the probe 9 which is inserted into the food is detachable.

In operation the thermal sensing element $9_1$ senses the temperature of the food and converts the information into electric signals.

In accordance with the invention, a particular type temperature comparator 11 is connected in series with the probe 9.

The results of the comparison are transferred to a gate terminal control block 18. One of the comparator signals is also applied to an inverter 27, and then to a flip-flop reset block 29 through an integration circuit 28.

The flip-flop reset block 29 is provided both with set signals from a cook-start switch 30 and with a reset signal from the integration circuit 28.

In operation a user begins cooking with a push on the cook-start switch 30, giving the flip-flop reset block 29 a set signal S.

Then the flip-flop reset block 29 will be turned on, energizing a driving block 31 which consequently will turn the relay 32 on to close the normally open switch 32a, thus forming the power supply circuit.

Since the inverter 27 is connected with a signal line communicating with the comparator 11 and the gate terminal control block 18, and this signal line corresponds to the lowest power level, the flip-flop reset block 29 will be provided with a reset signal by the inverter 27 and will be turned into the OFF state on condition that the output signal of the lowest power level line changes from the "1" logic level to the "0" logic level.

As the relay 32 will then be deenergized the normally open switch 32a will be opened and the power supply will be cut off.

It should be understood, however, that the magnetron 4 can at any time resume generating microwave if the cook-start switch 30 is given a push.

Figure 2:
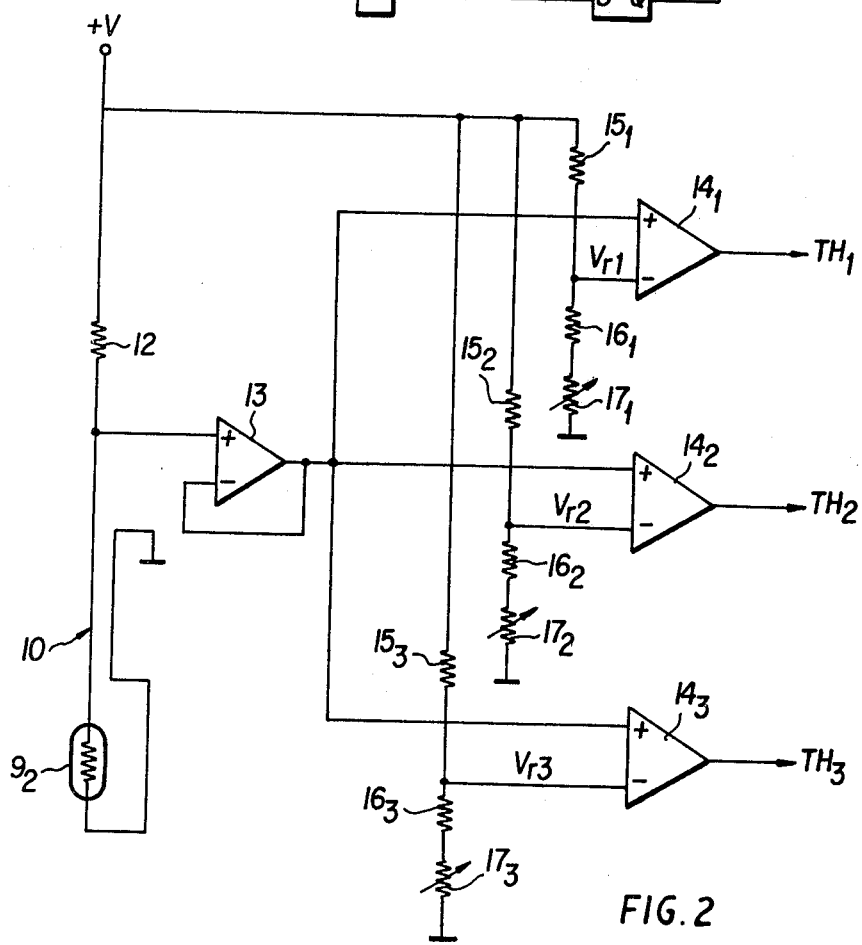
FIG. 2 is a schematic diagram showing the connections of the elements constituting the comparator shown in FIG. 1.

Referring now to FIG. 2, the comparator used in the invention is shown, in which a thermistor $9_2$ is provided to sense the temperature of the food in the heating oven. The thermistor $9_2$ is preferably inserted into the food for higher precision.

This can be achieved by mounting the thermistor on the acute sensing probe and by deeply piercing the food with the thermistor.

A lead wire connects the thermistor with an amplifier 13. A resistor 12 connected in series with the thermistor $9_2$ is in turn connected to the DC power source $+V$. The junction of the resistor 12 and the thermistor $9_2$ is connected to the positive terminal of the amplifier 13, while the output terminal of the amplifier 13 is fed back to its negative input terminal.

In response to the balance of the electric resistance between the resistor 12 and the thermistor $9_2$, the amplifier 13 sends amplified signals to the positive terminals of a plurality of comparator elements $14_1$, $14_2$, and $14_3$.

For the purpose of staggering the threshold temperature level, it is necessary that each comparator element be weighted differently in terms of electric voltage relative to ground.

In accordance with the particular embodiment of the present invention for each comparator element of $14_1$, $14_2$ and $14_3$, there is provided a set of relatively weighted resistors generally designated at 15, 16 and 17.

The first comparator element $14_1$ operates as the lowest temperature level comparator, so that the standard voltage $Vr_1$ should be higher than the other standard voltages $Vr_2$ and $Vr_3$.

The resistor $16_1$ and the variable resistor $17_1$ are connected between ground and the negative terminal of the comparator element $14_1$.

The resistor $15_1$ is also connected between the junction of the resistor $16_1$ and the positive DC supply $+V$.

The added resistance value of the resistor $16_1$ and the variable resistor $17_1$ should be comparatively high so that the standard voltage $Vr_1$ is set at a high value.

The similar connections are employed for the rest of the comparator elements $14_2$ and $14_3$, namely the resistors $15_2$, $16_2$ and the variable resistor $17_2$ are connected in series between ground and the positive DC power supply $+V$, with the junction between the resistor $15_2$ and the resistor $16_2$ connected to the negative terminal of the comparator element $14_2$.

The same arrangement of elements is applied to the third comparator element $14_3$ with the exception that different values are conferred on each element.

Figure 3:
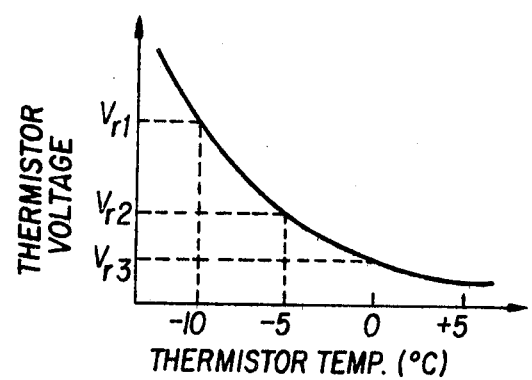
FIG. 3 is a graph illustrating the volt-temperature characteristic of the thermal sensor shown in FIG. 2.

Referring now to FIG. 3, the temperature-voltage characteristic of the thermistor to be used in this invention is presented.

The standard voltages $Vr_1$, $Vr_2$ and $Vr_3$ correspond to the values at $-10°$ C., $-5°$ C. and $0°$ C. respectively. Since the thermistor voltage does not follow a linear characteristic, the standard voltages are not in a proportional relationship.

It should be noted that in case a thermistor having a different temperature-voltage characteristic is employed as a temperature sensing element a new set of standard voltages should be obtained in accordance with the desired temperatures by adjusting the variable resistors $17_1$, $17_2$ and $17_3$.

Figure 4:
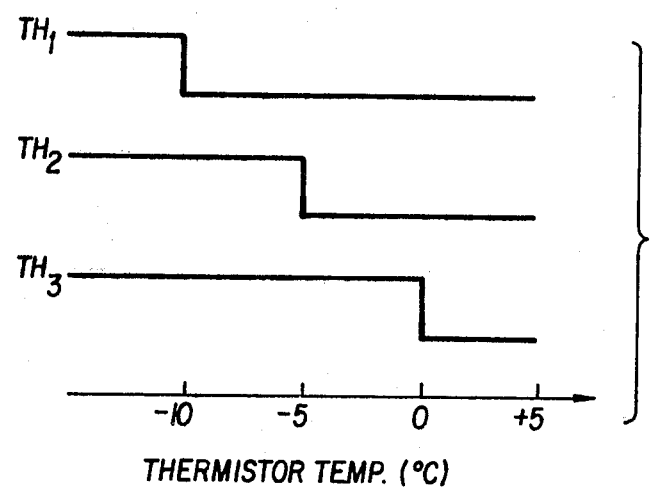
FIG. 4 is an illustration of the output level characteristics of the comparator elements shown in FIG. 2.

The output signals of the comparator elements $14_1$, $14_2$ and $14_3$ are indicated in FIG. 4 as $TH_1$, $TH_2$ and $TH_3$, respectively.

The function of the comparator element is now described. When a signal from the amplifier 13 proves greater than a respective reference signal, which means the temperature of the food is still lower than the one defined by the reference voltage $Vr_i$, the comparator element continues to deliver high level signals. However, once a signal from the amplifier 13 exceeds the respective $Vr_i$, which means that the temperature of the food exceeds the one defined by the reference voltage $Vr_i$, the comparator element ceases to send a high level output and instead begins to send a low level output.

The above-described condition can be better appreciated by reference to FIG. 4. Because the first comparator element $14_1$ is set to operate at the lowest temperature $-10°$ C., its output $TH_1$ is the first to change to a low state. Then comes the second comparator element output $TH_2$ which turns low at $-5°$ C., and then the third comparator element output $TH_3$ at $0°$ C.

As discussed above, when the third comparator element output $TH_3$ turns low, the low level signal is given to the flip-flop reset block 29, thereby opening the power supply circuit.

Figure 5:
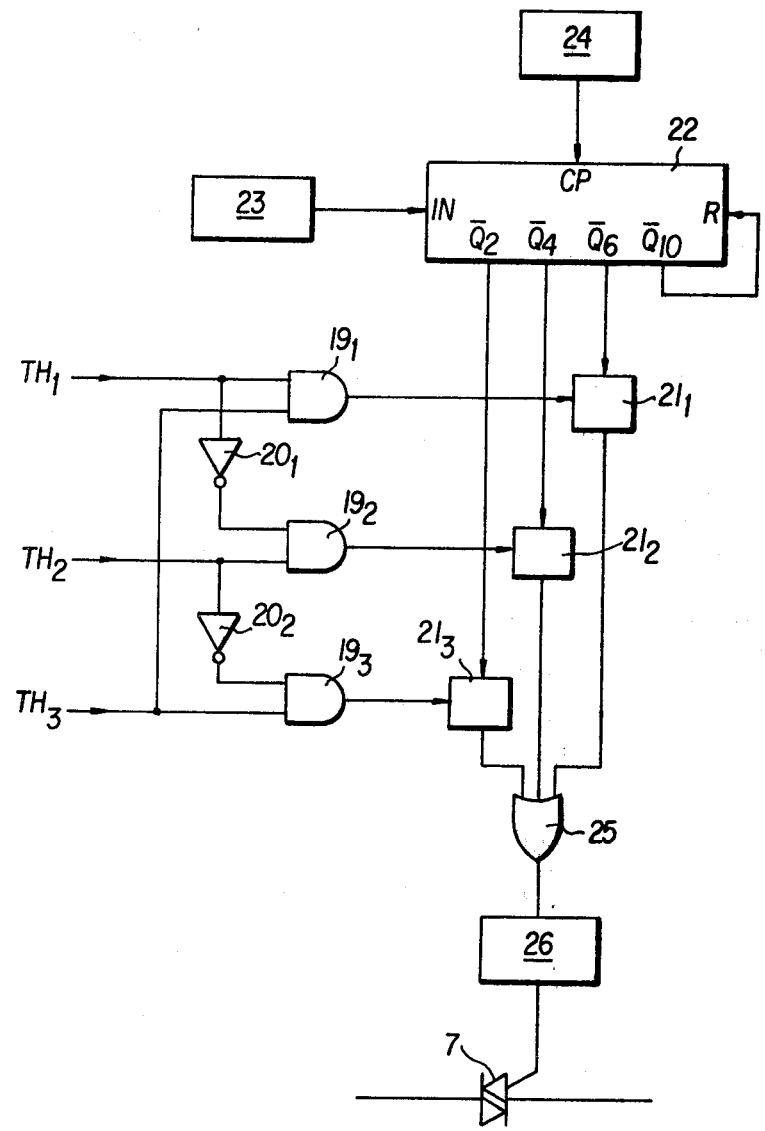
FIG. 5 is a circuit diagram of the magnetron power control circuit to be connected to the comparator illustrated in FIG. 2.

Referring now to FIG. 5, a circuit for controlling the gate of a thyristor 7 using a logical circuit is presented.

A set of comparator element outputs $TH_1$, $TH_2$ and $TH_3$ is brought to a logical gate circuit having three AND gates $19_1$, $19_2$ and $19_3$, and a couple of NOT gates $20_1$ and $20_2$.

Into the AND gate $19_1$ come the comparator outputs $TH_1$ and $TH_3$, while the AND gate $19_2$ is supplied with the comparator output $TH_2$ and the inverted $TH_1$ by way of the NOT gate $20_1$. Similarly the AND gate $19_3$ is provided with the comparator output $TH_3$ and the inverted $TH_2$ through the interposed NOT gate $20_2$.

The output signals of the AND gates $19_1$, $19_2$ and $19_3$ are sent to a set of analog switches $21_1$, $21_2$ and $21_3$, respectively.

Additionally connected with the analog switches $21_1$, $21_2$ and $21_3$ is a shift register 22 for generating kinds of duty cycle pattern signals, such as $\overline{Q}_2$, $\overline{Q}_4$ and $\overline{Q}_6$, and sending them to the analog switches $21_1$, $21_2$ and $21_3$. The shift register 22 is resettable to a particular output configuration to produce outputs of varying duty cycle.

Figure 6:
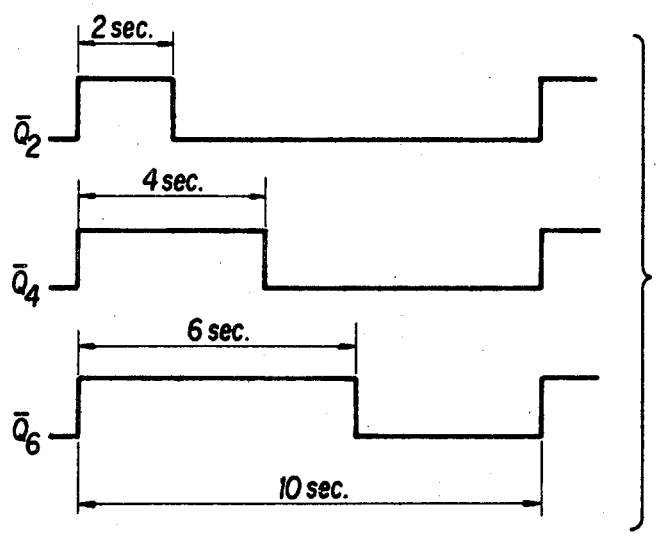
FIG. 6 is an illustration of the timing intervals of the shift register on which the firing of the thyristor shown in FIG. 5 depends.

The shift register 22 in this embodiment can produce ten different duty cycle patterns of ten seconds, namely $\overline{Q}_1$ through $\overline{Q}_{10}$, each continuing to send high level signals for a period corresponding to the accompanying numeral and then sending low level signals for the rest of the cycle, for example as shown in FIG. 6, the duty cycle pattern $\overline{Q}_2$ sends high level signals for two seconds followed by the light seconds of low level signals alternatively. As for the duty cycle pattern $\overline{Q}_4$, this pattern exhibits a high level keeps for four seconds and a low level for the rest of the six seconds. The duty cycle pattern $\overline{Q}_6$ has six seconds of high levels and the subsequent four seconds of low levels.

To enable the requisite outputs to be supplied, shift register 22 is provided with a signal supplying circuit 23, which keeps supplying a high level signal, and with a pulse generating circuit 24 which produces pulses at one second intervals, in order to shift the high level from one stage to another.

Still referring to FIG. 5, the duty cycle pattern terminal $\overline{Q}_6$ and the AND gate $19_1$ are connected to the analog switch $21_1$, the duty cycle pattern terminal $\overline{Q}_4$ and the AND gate $19_2$ are connected to the analog switch $21_2$ and similarly the duty cycle pattern $\overline{Q}_2$ and AND gate $19_3$ terminal are connected to the analog switch $21_3$.

All the analog switches $21_1$, $21_2$ and $21_3$ are connected to the OR gate 25.

The gate of the thyristor 7 can be controlled through the gate control circuit 26 which is interposed between the OR gate and the thyristor 7.

It will be readily appreciated that the thyristor 7 is thus energized and deenergized according to the duty cycle patterns $\overline{Q}i$ in response to the food temperature.

Figure 7:
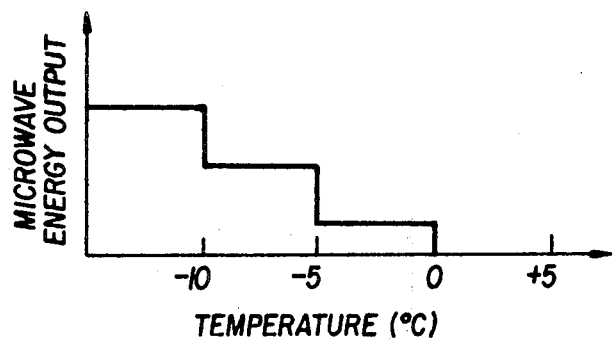
FIG. 7 is a graph illustrating the power level-temperature characteristic of the magnetron employed in a microwave oven of the present invention shown in FIG. 1.

From the food temperature below $-10°$ C., as is shown in FIG. 7, the magnetron performs with the duty cycle pattern $\overline{Q}_6$, the highest capability of the present embodiment, with the analog switch $21_1$ closed.

Within the temperature range from $-10°$ C. to $-5°$ C. the magnetron power is decreased to the duty cycle pattern $\overline{Q}_4$. The thyristor 7 is triggered via the closed analog switch $21_2$.

When the temperature increases above $-5°$ C., the duty cycle pattern changes into $\overline{Q}_2$, the magnetron power being decreased to another lower rank, and after the temperature becomes higher than the freezing point, the magnetron automatically suspends operation.

It should be understood that in this way the microwave of the invention controls its duty cycle operation in response to the directly sensed food temperature as the temperature increases with the heating time, so that it becomes unnecessary to set in advance the heating time and heating power required to thaw the frozen food.

Obviously, numerous modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. A microwave oven having an open cavity, comprising:
   an electric power source;
   a magnetron for generating microwave energy in the oven cavity in which frozen foods to be thawed are placed, wherein the frozen food is thawed by absorption of the microwave generated by said magnetron; and
   thawing control means coupled to said magnetron in order to control the power of said magnetron during a thawing operation, said control means comprising,
   sensor means for detecting the temperature of the food placed in the oven cavity, and
   temperature setting means for decreasing the magnetron power output step by step in response to the food temperature detected by the sensor means to thaw the food without impairment thereof,
   comparator means connected to said sensor means and provided with at least one preset temperature signal with which the detected food temperatures from said sensor means are compared to generate at least one comparison result,
   shift register means for producing duty cycle signals for differing predetermined time duration,
   gating means coupled to said comparator means and said shift register means for producing a magnetron duty cycle control signal based on a logical combination of said at least one comparison result and the duty cycle signals produced by said shift register means,
   wherein the duty cycle of said magnetron is controlled based on said duty cycle control signal to control the magnetron energy output in dependence on the temperature of the food placed in the oven cavity.

2. The microwave oven of claim 1, further comprising:
   said comparator means comprising a plurality of comparator elements each having a different preset temperature signal, said comparator elements comparing the detected food temperatures with said preset temperature signals to produce respective of said comparison results, which are applied to said gating means, and
   said gating means logically combining respective of said duty cycle signals produced by said shift register means in dependence of said respective comparison results to produce said duty cycle control signal based on the respective comparison results.

3. The microwave oven of claim 1 in which said sensor means is adapted to be mounted in direct contact with the food to be heated.

4. The microwave oven of claim 3 in which said sensor means is adapted to pierce the food in the oven cavity for sensing the temperature of the food.

5. The microwave oven of claim 3 in which said sensor means includes a portion detachably connected therewith, said portion sensing the temperature of the food.

6. The microwave oven of claim 2 in which said control means controls said magnetron to decrease the generated microwave energy as the detected food temperature increases.

7. The microwave oven of claim 3 in which said sensor means comprises:
   a thermistor.

8. The microwave oven of claim 2 in which said control means controls said magnetron to suspend operation when said sensor means identifies a highest preset temperature signal.

9. The microwave oven of claim 1 in which said control means comprises:
   a thyristor connected to said electric power source, said control means varying the microwave energy generated by said magnetron by controlling the gate signal of said thyristor.

10. The microwave oven of claim 2 in which said preset temperature signals are variable.

* * * * *